UNITED STATES PATENT OFFICE.

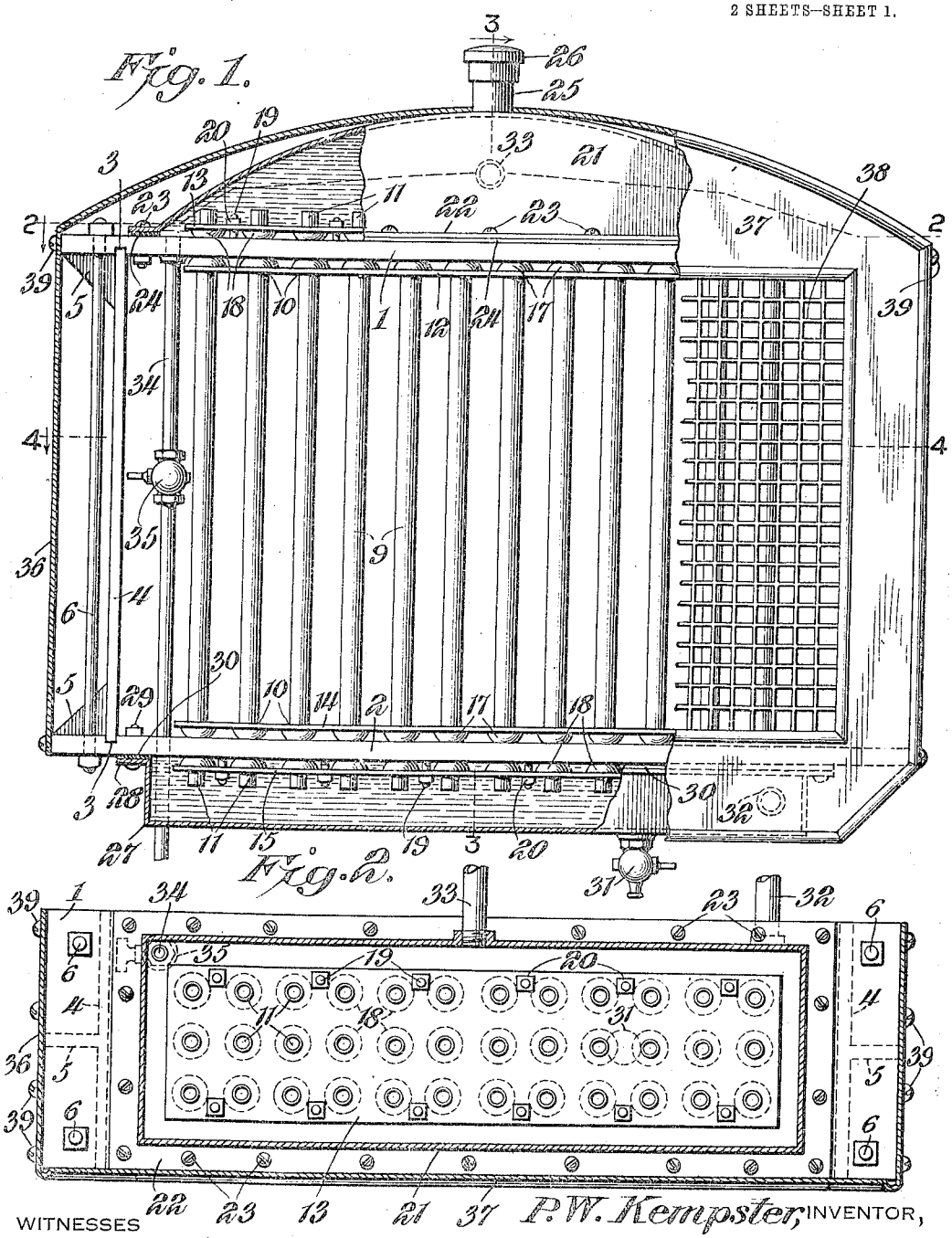

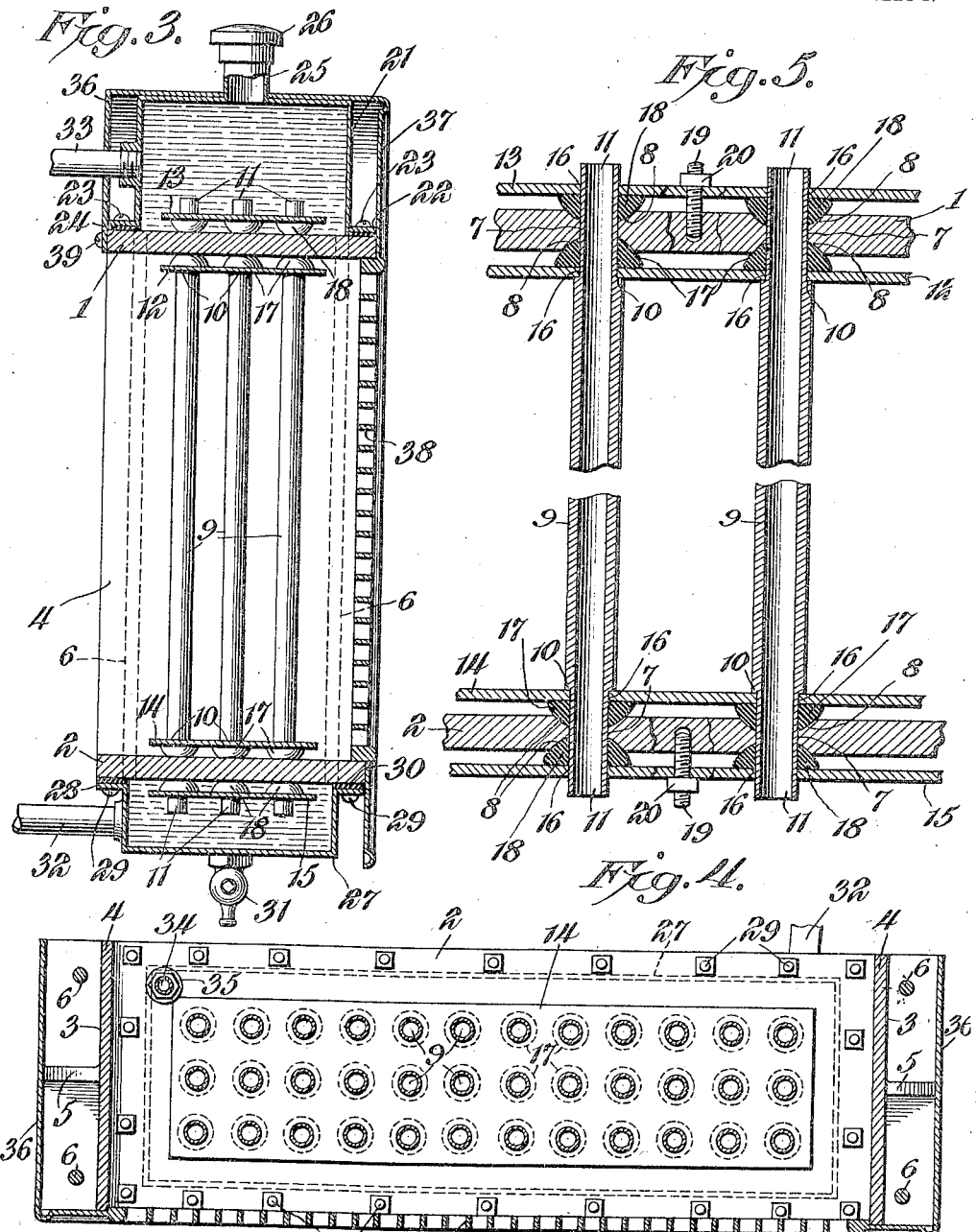

PERRY WARD KEMPSTER, OF PROPHETSTOWN, ILLINOIS.

AUTOMOBILE-RADIATOR.

1,101,634.

Specification of Letters Patent.

Patented June 30, 1914.

Application filed April 9, 1913. Serial No. 760,060.

*To all whom it may concern:*

Be it known that I, PERRY W. KEMPSTER, a citizen of the United States, residing at Prophetstown, in the county of Whiteside and State of Illinois, have invented a new and useful Automobile-Radiator, of which the following is a specification.

This invention has reference to improvements in radiators for explosion engines of automobiles, and its object is to provide a radiator which may be readily assembled or taken down with a minimum of labor.

It is customary to provide radiators in automobiles for maintaining the water circulating through the water jacket of the engine at a suitably low temperature and it is customary to locate such radiators at the front of the hood, so that when the automobile is traveling there is a rush of air through the radiator structure serving to absorb the radiated heat and thereby accelerate the radiation, the effect being sometimes augmented by the use of a fan. A prevalent type of radiator is made up of upper and lower headers connected together by numerous pipes usually standing upright and the radiator structure is inclosed in a casing giving an ornamental effect. It is customary to solder the pipes to the headers and even to solder the casing to the radiator structure, so that in the event of injury of any kind or leakage, it is often a matter of some days' labor and commensurate expense to repair such radiator, especially where the fault is with some pipe or pipes in the mid portion of the radiator. The number of pipes is large and there are often as many as four rows of such pipes.

In accordance with the present invention the structure is of a knock down character, that is the parts may be assembled or disconnected by the application or removal of a few screws or bolts, while at the same time leakage under normal conditions is wholly prevented. Should, however, leakage occur the defective pipe or pipes may be readily reached by only a partial dismantling of the structure and the repairs may be made and the dismantled parts reassembled all within a comparatively short time, say, within an hour, as against one or two or more days' labor with radiators of the type almost universally employed in the automobile art.

A quite prevalent cause of injury to radiators is the freezing of the water in cold weather, and then the pipes will burst meaning that with the prevalent style of radiators the whole structure must be laboriously dismantled and laboriously reassembled with proper repairs. Should such an accident occur with the radiator of the present invention skilled labor is not needed to make repairs nor is much time required and when the radiator is reassembled the fact that repairs have been made is not at all apparent so far as appearance goes.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings but may be changed and modified so long as such changes and modifications mark no material departure from the salient features of the invention.

In the drawings:—Figure 1 is an elevation of the improved radiator as viewed from in front, with some parts broken away and shown in section in different planes toward the rear. Fig. 2 is a section on the line 2—2 of Fig. 1. Fig. 3 is a section on the line 3—3 of Fig. 1. Fig. 4 is a section on the line 4—4 of Fig. 1. Fig. 5 is a vertical section through two of the radiator pipes and adjacent parts drawn on a larger scale than the other figures to illustrate some details of the construction.

Referring to the drawings there are shown two plates 1, 2 which may be of elongated rectangular outline and may be made of steel or other suitable material. Each of these plates near the ends is provided with lateral grooves 3 in one face constituting seats for the ends of corresponding end pieces 4 designed to determine the spacing apart of the top and bottom plates 1 and 2, and these end pieces 4 are provided near each end with webs 5 forming abutments for engaging the adjacent faces of the top and bottom members 1 and 2 so that rocking of these parts upon the end plates or pieces 4 is prevented. The two top and bottom members 1 and 2 are held together by bolts 6 traversing said members adjacent the end plates 4 and preferably exterior thereto. Each plate 1 and 2 has numerous holes or passages 7 therethrough, those of one plate matching those of the other, and these passages are countersunk at the opposite ends, as indicated at 8.

Extending between the top and bottom plates 1 and 2 are pipes 9 each shouldered near the ends as indicated at 10 and beyond the shoulders 10 having continuations 11 of reduced external diameter adapted to the passages 7 which may be smaller than the pipes, or the shoulders may be otherwise produced to serve the purpose for which they are intended. The pipes 9 may be arranged in any suitable order, either in straight rows, as indicated, or staggered or in any way customary in the construction of automobile radiators. Considering the radiator as in position and standing upright, the plate or top member 1 has adjacent to it but spaced from its lower face a plate 12 and adjacent to but spaced from its upper face another plate 13, while the plate 2 has a plate 14 adjacent to but spaced from its upper surface and another plate 15 adjacent to but spaced from its lower surface. The plates 12 and 14 have passages 16 therethrough of a size to be traversed by the ends 11 of the pipes or tubes 9, the plates 12 and 14 abutting against the shoulders 10. Surrounding each pipe or tube extension 11 between the respective plates 12 and 14 and the members 1 and 2 are gaskets 17 entering the corresponding countersunk portions 8 and between the plates 13 and 15 and the respective end members 1 and 2 are other gaskets 18 surrounding the tube extensions 11 and seating in the respective countersinks 8. The plates 12 and 14 are held by the shoulders 10 against the gaskets 17 and force the latter into their seats because of the clamping together of the end members 1 and 2 by the bolts 6. The plates 13 and 15 are traversed by stub bolts 19 carried by the members 1 and 2 and nuts 20 on these stub bolts serve to hold the plates 15 against the gaskets 18 with sufficient pressure to force the gaskets into their respective seats. The gaskets 17 and 18 may be of rubber or of any suitable material which under the pressure employed will engage in the seats 8 and hug the tube extensions 11 in a manner to produce a fluid-tight joint between the tube extensions 11 and the respective members 1 and 2.

Mounted on the top of the member 1 is an upper header 21 of sufficient length and width to inclose all the upper ends of the tubes 9, the header 21 having peripheral flanges 22 for the passage of bolts 23 or other suitable means for securing the header to the plate or top member 1 and the junction of the edge portions of the header 21 with the top member 1 may be made fluid tight by interposed packing 24. The header 21 is arch-shape to conform to the usual practice in making the upper portion of the radiator arched in agreement with the customary form of the hood of the automobile, but, of course, the header 21 may be otherwise shaped. At the crown of the arch header 21 a filling tube 25 is provided and this filling tube, as is customary, is supplied with a cap 26 usually screwed into place so as to be readily removable for the introduction of water into the header 21 so that this header constitutes a water chamber communicating with all the tubes 9.

Depending from the lower plate or member 2 is a lower header 27 having a marginal flange 28 for the passage of holding bolts 29 and between this flange and the under surface of the member 2 is packing 30. The header 27 is of a size to include the lower ends of all the tubes 9 with which it freely communicates, so that the two headers 21 and 27 are in multiple communication by way of all the tubes 9 simultaneously. The header 27 is provided with a drain valve 31 and with a pipe connection 32 for communication with the water jacket of the engine of the automobile and the header 21 is provided with a pipe connection 33 for a like purpose. The presence of the plate 13 necessitates an elongation of the extensions 11 of the tubes 9 carrying them some little distance above the upper surface of the top member 1, so that there is a considerable body of water trapped in the header 21 should it be desirable at any time to drain the radiator by way of the valve 31. To overcome this a pipe 34 leads through the top member 1 on a level with its upper surface to a low point, and this pipe is provided with a valve 35 by means of which a relatively dead space within the header 21 may be drained, so that the entire radiator may be wholly emptied of water when it is desired to drain the radiator.

To produce a finish it is customary to inclose the radiator structure in a casing 36 extending around the sides of the structure and across the top thereof and having a front plate 37 hiding the radiator structure, while the plate 37 has a front opening covered by a grid or grating 38 of any suitable construction permitting the passage of air to the tubes 9 in a multitude of small streams, so that when the vehicle is traveling a flow of air occurs through the grating 38 into engagement with the tubes 9, thus effectively cooling them. The grating may be made permanently fast to the front 37 of the casing 36 and the latter may be secured to the top and bottom members 1 and 2 by screws 39 or in any other manner permitting ready detachment.

When the radiator is to be put into service the valves 31 and 35 are closed and the cap 26 is removed and water is poured through the tube or neck 25 until the level of water has risen into the header 21 to an appropriate height which should be above the upper ends of the extensions 11 of the tubes 9 and above the pipe 33. When the engine is running there is a circulation of water through the radiator in the usual manner and on passing through the tubes 9 the heat radiated from these tubes is absorbed by the flowing air and the water is correspondingly chilled, so that on its return to the engine it enters the latter in the chilled condition and the engine is thereby kept cool. So far as the action of the radiator is concerned it is substantially that of radiators as ordinarily constructed.

Suppose, however, that for some reason or other it should be necessary to make repairs as would be the case should one or more of the tubes 9 become damaged. In order to repair the radiator the water is drained therefrom, the cap 26 is removed and the screws 39 are also removed, whereupon the casing 36 may be taken away from the radiator exposing the interior thereto, and if it be desired to remove the radiator from the automobile the pipes 32 and 33 are disconnected from the engine and the radiator is disconnected from its support on the automobile, after which the header 21 is readily removed by unfastening the bolts 23, thus exposing the plate 13. If the defect should be in the nature of a leak in any one of the tubes 9 where passing through the plate or top member 1, then by removing the nuts 20 on the stub bolts 19 holding the plate 13 in place, the latter may be lifted from the tubes 9 and from the gaskets 8 engaged by the plate 13, thus exposing all said gaskets. If it be one of the gaskets 18 which is defective, such gasket may be replaced by a new one at a cost of only a fraction of a cent and the plate 13 may be replaced to be followed by the replacing of the parts already removed. If the radiator is still fast to the automobile, it is then ready for the reintroduction of water and may then be put into service. Suppose, however, that the body of one or more of the tubes 9 is defective and it becomes necessary to replace such defective tubes with others. Then in addition to removing the plate 13 the bolts 6 are disconnected and the end member or plate 1 is lifted from the upper extensions 11 of the tubes 9, together with all the gaskets above the plate 1. The gaskets 17 at the upper ends of the tubes 9 are now removed, whereupon the plate 12 may be lifted from the shoulders 10 on the upper ends of the tubes 9, after which the defective tubes 9 may be removed without disturbing the lower set of gaskets, although it may be found desirable to loosen up the pressure of these gaskets which may be done by removing the header 27 and easing up on the nuts 20 of the bolts 19 carried by the end member 2. The new tube or tubes 9 are placed in position when the parts may be again assembled in reverse order to the disassembling thereof and the radiator is again ready for service on being supplied with a suitable quantity of water.

Should it be desirable to completely dismantle the whole radiator, it may be done in a very short time and the radiator can be reassembled in a similarly short time. Any one familiar with the construction of the radiator of the present invention can dismantle and reassemble the radiator in, say, an hour or less, making such exchanges of perfect parts for damaged parts as may be necessary. In the prior forms of radiators for automobiles the joints are soldered and even the outer casing is soldered in place so that to dismantle and reassemble a radiator is often the work of a day or more and requires a skill not at all called for in the dismantling and assembling of the radiator of the present invention. Moreover, soldered joints are often unreliable and are the cause of leaks which mean the expenditure of perhaps a day or more to overcome. In the present invention the joints are all more or less yielding, and are of a nature which prevents leakage even under the shocks and jars to which the radiator may be subjected when on an automobile in service.

What is claimed is:—

1. An automobile radiator comprising spaced top and bottom members each with passages therethrough, tubes extending between the top and bottom members and each provided with an end extension of reduced diameter to form a shoulder at the junction of the reduced portion with the main portion of the tube, the reduced portion of the tube being adapted to a respective passage through a respective end member, packing gaskets between the shouldered portions of the tubes and end members, a header carried by each of the top and bottom members in communication with the tubes, and means for the connection of the headers with an automobile engine, the several named members of the radiator being connected by readily removable fastening devices to permit the entire or partial assembling or dismantling of the radiator.

2. An automobile radiator comprising spaced plates having spacing members between the end portions and connecting bolts also near the end portions, said plates being provided with matching perforations, tubes extending between the plates and having end continuations of less external diameter than the tubes forming shoulders at the junction of the continuations with the bodies of the tubes, perforated plates at the ends of the tubes traversed by said reduced continuations and located on opposite sides of the first named plates, packing gaskets surrounding the tube extensions on opposite sides of said first named plates and held thereto by said second named plates, readily removable means for holding said second named plates on the sides of said first named plates remote from the bodies of the tubes, and headers secured to the first named plates on the faces thereof remote from the bodies of the tubes, the securing means being in the form of readily removable fastenings.

3. An automobile radiator comprising spaced plates having spacing members between the end portions and connecting bolts also near the end portions, said plates being provided with matching perforations, tubes extending between the plates and having end continuations of less external diameter than the tubes forming shoulders at the junction of the continuations with the bodies of the tubes, perforated plates at the ends of the tubes traversed by said reduced continuations and located on opposite sides of the first named plates, packing gaskets surrounding the tube extensions on opposite sides of said first named plates and held thereto by said second named plates, readily removable means for holding said second named plates on the sides of said first named plates remote from the bodies of the tubes, and headers secured to the first named plates on the faces thereof remote from the bodies of the tubes, the securing means being in the form of readily removable fastenings, and the radiator being provided with an exterior casing including a front plate and grating, said last named casing being connected to the radiator by readily removable fastening devices.

4. An automobile radiator comprising spaced plates having spacing members between their end portions and connecting bolts also near the end portions, said plates being provided with matching perforations, tubes extending between the plates and having end continuations of less external diameter than the tubes forming shoulders at the junction of the continuations with the bodies of the tubes, perforated plates at the ends of the tubes traversed by said reduced continuations and located on opposite sides of the first named plates, packing gaskets surrounding the tube extensions on opposite sides of said first named plates and held thereto by said second named plates, readily removable means for holding said second named plates on the sides of the first named plates remote from the bodies of the tubes, and headers secured to the first named plates on the faces thereof remote from the bodies of the tubes, the securing means being in the form of readily removable fastenings, and the radiator being provided with an exterior casing including a front plate and grating, and connected to the radiator by readily removable fastening devices, the headers being each provided with draining means individual thereto.

In testimony that I claim the foregoing as my own, I have hereto affixed my signature in the presence of two witnesses.

PERRY WARD KEMPSTER.

Witnesses:
SWAN W. LINDQUIST,
HOWARD RAPP.